United States Patent
Cattaneo (10) Patent No.: US 10,173,269 B2
(45) Date of Patent: Jan. 8, 2019

(54) THREE DIMENSIONAL WORKPIECE SUPPORT AND DRILL JIG ALIGNMENT DEVICE FOR PLACEMENT OF WEIGHT LOADING CHANNELS IN THE BODY OF A MODEL CAR

(71) Applicant: Stephen Cattaneo, Dublin, OH (US)

(72) Inventor: Stephen Cattaneo, Dublin, OH (US)

( * ) Notice: Subject to any disclaimer, the term of this patent is extended or adjusted under 35 U.S.C. 154(b) by 0 days.

(21) Appl. No.: 15/603,457

(22) Filed: May 24, 2017

(65) Prior Publication Data
US 2018/0339346 A1    Nov. 29, 2018

(51) Int. Cl.
*B23B 47/28*    (2006.01)
*A63H 17/00*    (2006.01)

(52) U.S. Cl.
CPC ........... *B23B 47/28* (2013.01); *A63H 17/002* (2013.01)

(58) Field of Classification Search
CPC ..... B23B 47/287; B23B 47/28; B23B 47/288; B23B 2247/08; B23B 2247/06; B23B 2247/12
See application file for complete search history.

(56) References Cited

U.S. PATENT DOCUMENTS

| | | | | |
|---|---|---|---|---|
| 626,488 A * | 6/1899 | Diehl | ................... | B23B 47/287 408/103 |
| 2,838,966 A * | 6/1958 | Robertson | ............. | B23B 47/288 408/115 R |
| 3,008,359 A * | 11/1961 | Mackey | ................ | B23B 47/287 408/115 R |
| 3,031,669 A * | 5/1962 | Lawson | ................... | B23B 47/28 33/613 |
| 4,394,800 A * | 7/1983 | Griset | ................... | B23B 47/287 33/32.3 |
| 4,449,867 A * | 5/1984 | Dergo | ..................... | B23B 47/28 408/103 |
| 4,538,354 A * | 9/1985 | Smolik | ................... | B23B 47/28 33/563 |
| 4,594,032 A * | 6/1986 | Warburg | ............... | B23B 47/288 408/115 R |
| 5,222,845 A * | 6/1993 | Goldstein | ............. | B23B 47/287 408/103 |

(Continued)

FOREIGN PATENT DOCUMENTS

DE    29602888 U1 *    4/1996    ........... B23B 47/287

*Primary Examiner* — Nicole N Ramos
(74) *Attorney, Agent, or Firm* — JUNEAU & MITCHELL; Todd L. Juneau (57) ABSTRACT

The embodiment is an L-shaped housing with a configuration that provides both for support to a small hand-held workpiece and to specific drill bit alignment toward the task of placing multiple, immediately adjacent, aligned channels within the body of a model car. To optimize car speed in the Pinewood Derby event, the child can specifically align and strategically place channels in the model car for the optimal loading of cylindrical weights. As an alternative to free-hand drilling with an attempt at sighting drill bit direction in two planes, the device provides for precise drill bit alignment to small hand-held workpieces. As an alternative to more complex drill jig and machine shop equipment, the device enables a child to safely and effectively introduce multiple, aligned channels with precision into the model car.

2 Claims, 10 Drawing Sheets

(56) References Cited

U.S. PATENT DOCUMENTS

| | | | | |
|---|---|---|---|---|
| 5,466,098 A * | 11/1995 | Juang | .................... | B23B 47/288 |
| | | | | 408/103 |
| 5,569,001 A * | 10/1996 | Brutscher | ............. | B23B 47/287 |
| | | | | 33/638 |
| 5,954,461 A * | 9/1999 | Lemieux | ............... | B23B 47/288 |
| | | | | 408/115 R |
| 6,244,795 B1 * | 6/2001 | Fenelon | ................ | B23B 47/288 |
| | | | | 408/115 R |
| 6,283,685 B1 * | 9/2001 | Lemieux | ............... | B23B 47/288 |
| | | | | 408/115 R |
| 6,394,713 B1 * | 5/2002 | Yates, Sr. | .............. | B23B 47/288 |
| | | | | 408/115 R |
| 8,376,333 B2 * | 2/2013 | Zander | .................. | B23B 47/287 |
| | | | | 269/1 |
| 2007/0175176 A1 * | 8/2007 | Lane | .................... | B23B 47/287 |
| | | | | 52/749.1 |
| 2014/0178141 A1 * | 6/2014 | Gargiulo | ............... | B23B 47/287 |
| | | | | 408/108 |

* cited by examiner

THREE DIMENSIONAL WORKPIECE SUPPORT AND DRILL JIG ALIGNMENT DEVICE FOR PLACEMENT OF WEIGHT LOADING CHANNELS IN THE BODY OF A MODEL CAR

BACKGROUND

Field of the Invention

The invention relates to a platform for aligning a drill bit.

Description of the Prior Art

The Pinewood Derby is an annual Boy Scouts of America event which provides the opportunity for over one million Cub Scouts and their parents, in a team effort, to design and prepare a winning derby car. Other organizations participate in similar model car racing events including Awana Grand Prix, Awana international, Native American Sons and Daughters, Kub Kar scouting. This is our audience.

Children, 7 through 11 ½ years of age, along with a parent, work together to develop a model wooden car with emphasis on design and/or speed. For speed there are basic principles of weight distribution generally providing for weight loading toward the rear of the car to optimize the potential energy. Racing rules generally permit a maximum car weight of 5 ounces. Moreover, weights added on to the top and bottom surfaces of the car to achieve the optimal weight of 5 ounces can compromise speed by offering protruding surfaces for turbulence and air resistance, as the car races down the track. Additional weight loading is, therefore, best placed within the wood body of the car.

There has been a longstanding need for a simple device to enable a child to place pockets to load flat weights or to place channels to load cylindrical weights within the wood body of the car. Square or rectangular pockets to insert flat weights which are commercially available are difficult for the child to create without the use of chisels or special rotary tools. A uniform depth with square corners throughout the pocket can be both difficult to achieve and very time consuming. Direct adult assistance is usually required.

A simple structural workstation device was conceived to address this concern. The device enables the Cub Scout to create:

a. multiple, parallel, immediately adjacent, cylindrical channels toward the rear of the model car for optimal weight loading of cylindrical weights.

b. precision placement of drill bit holes in a manner to avoid breaching the top, side or bottom surfaces of the car design.

c. precision placement of weight loading channels to avoid breaching the axle grooves that are placed during the manufacturing of the rectangular wood blocks provided for the Pinewood Derby car events.

The three dimensional workpiece support/drill jig alignment embodiment has been reduced to practice. A prototype has been built and has performed with precision. Cylindrical model car weights are commercially available. The marketing potential is formidable.

Traditionally, cylindrical weights are loaded into the wood body of the model car using a hand drill or rotary tool. Multiple channels may be required to achieve the desired total car weight. Measurements for channel placement are carefully made on the rectangular block of wood which has been manufactured to specification for Pinewood Derby car events. The individual car design selected by the child may make channel placement considerations more difficult if the workpiece surfaces are no longer linear and square.

The child, with adult supervision, utilizing the hand drill with drill bit of predetermined size has to sight down the center of the car as he advances the drill bit into the back of the car. The parent or supervising adult has to sight from the side noting the direction of the drill bit, top to bottom on the car. This dual sighting in this free, hand-held traditional technique can be difficult and can be frustrating when a surface of the car has been breached. This occurs when the central axis of the drill hole is not parallel to the bottom or side of the car. This also makes it more difficult to introduce a second or third hole into the back of the car for additional weight placement. The channels cannot overlap if the cylindrical weights are to load freely.

Another alternative for a more precision placement of cylindrical channels has been with the use of a drill press. The technique has traditionally been described in Pinewood Derby car workbooks. Special machine shop equipment including the drill press is not universally available to the child/parent team and Cub Scout participation, with concern for safety, is limited in this drill press application. Moreover, an irregular shaped model car with few flat, linear surfaces may be difficult to hold and position on the drill press platform. The three dimensional workpiece support with drill jig alignment provided by the proposed embodiment was designed to compensate for irregular workpieces.

Various devices have been designed to assist the Cub Scout in the placement of holes to align axles in the wood body of the model car. These devices are specifically for placement of the wheel axles.

The U.S. Pat. No. 20140178141 to Gargiulo discloses an adjustable drill guide which is specifically designed to provide holes to accurately place axles and eyelets into the model car. These are not multiple aligned, immediately adjacent, parallel channels.

Similarly, U.S. Pat. No. 6,904,694 to Launius discloses a wood body tool to accurately place axle holes into the wood axle slots of the model car. Again, these are not, parallel, immediately adjacent, aligned channels. The axle holes are placed and guided within the axle slots already in position at the bottom of the car.

The use of Jigs to guide drill bits is well known in prior art toward the placement of channels in wood, metal or other materials in a specific orientation. Jigs have been designed for purposes as varied as vehicle axle repair, support guides for dental implants, CNC machines and, more specifically, with relevance to woodworking embodiments, for the joining of wood surfaces in specific configurations utilizing dowels, screws or bolts.

U.S. Pat. No. 2004110687 to Davis discloses a doweling jig for wood working, specifying clamping devices to fix the Jig to the workpiece. Holes are drilled to receive dowels to join workpieces. The holes are not multiple, aligned or immediately adjacent and three dimensional support to the workpiece is not described.

U.S. Pat. No. 7,726,916 to MacKenzie discloses a doweling jig comprised of two spaced rails which facilitates a slidable drill bit guide. The device, affixed to one surface of the workpiece, is complex. Small, hand-held workpieces could be difficult to secure.

These patents and other drill jig alignment patents may well provide for their particular objectives. Many are complex devices for large workpieces which do not permit hand-held operations for small workpieces, 2 to 10 cm in size. Moreover, utilization by a child is limited, even with adult supervision. A simple, L-shaped housing device is presented which provides for three surface support to a small, hand held workpiece with drill bit alignment for the placement of parallel, immediately adjacent, aligned weight loading holes in a model car.

Precision weight loading within the wood body of the derby car is essential to maximize the potential energy. As the front of the car clears the sloped portion of the race track, the rear weight is still falling. The weight must be as far back as possible so that the force of gravity continues to propel the car as long as possible. The center of car balance is best 1 to 1¼ inch in front of the rear axle. It is important, therefore, for the child to strategically position the car weights with precision. This is difficult to do as we have noted with the traditional technique of using hand/eye coordination to sight and direct the direction of the drill bit as channels are being drilled with a hand-held electric drill. The car side, bottom and top surfaces are easily breached if channel alignment is not parallel to the central axis of the model car. Moreover, when multiple channels are needed for weighting, immediately adjacent channels may be breached and not allow the cylindrical weights to freely enter the respective channels.

The present embodiment overcomes any limitations of prior art toward the specific objective presented, in the setting of child participation. The Cub Scout, with parent assistance, can now create channels for precision alignment of model car weights in variable car designs. Moreover, the device with unique three dimensional support to the small workpiece provides for a secure and more precise placement and alignment to the drill bit guide.

SUMMARY OF THE INVENTION

The three dimensional workpiece support/drill jig alignment device is basically an L-shaped housing embodiment with a sliding upper rectangular platform with a lateral workpiece support column providing three dimensional support to a small hand-held workpiece. The basic L-shaped housing provides two dimensional support at the bottom and front or back edge of the workpiece while the L-shaped, sliding upper rectangular platform provides a third lateral support column. This provides for a fixed placement and positioning of the model car workpiece which is linearly aligned with the drill bit guide in the vertical column of the L-shaped housing. Incremental lateral sliding of the upper platform to a predetermined location provides for the drilling of multiple, adjacent, parallel and aligned channels.

Access to prior art techniques for precision channel alignment utilizing machine shop tools such as a drill press or CNC machining may be limited. With concern for child safety, the parent, sponsor or machine shop specialist is principally involved in the placement of these weight loading channels. Cub Scout participation is therefore limited in a project and event promoting Scout participation. The three dimensional workpiece support/drill jig alignment device enables the Cub Scout to hand-hold his model car in the proposed embodiment while advancing a drill bit utilizing a hand held drill through the drill jig guide in the vertical column. Aligned channels can be placed with precision. The need for a drill press is obviated.

Moreover, the device provides for support to model cars designed and carved with irregular shapes keeping them in position to produce parallel, immediately adjacent and aligned channels for a specific weight loading purpose.

The device has many of the advantages of conventional drill jig systems and none of the disadvantages. It enables a child, with adult supervision, to perform the task.

The device meets a need, providing an efficient mechanism to facilitate the insertion of weight loading channels in predetermined locations with precision. Traditional techniques utilizing visual sighting in two planes is time consuming and often ineffective.

The device can be manufactured cost effectively. A prototype has been produced and utilized with ease and precision.

Cylindrical model car weights are commercially available and are marketed by two or more companies. The marketing potential is formidable.

DESCRIPTION OF FIRST EMBODIMENT

Figure 1:
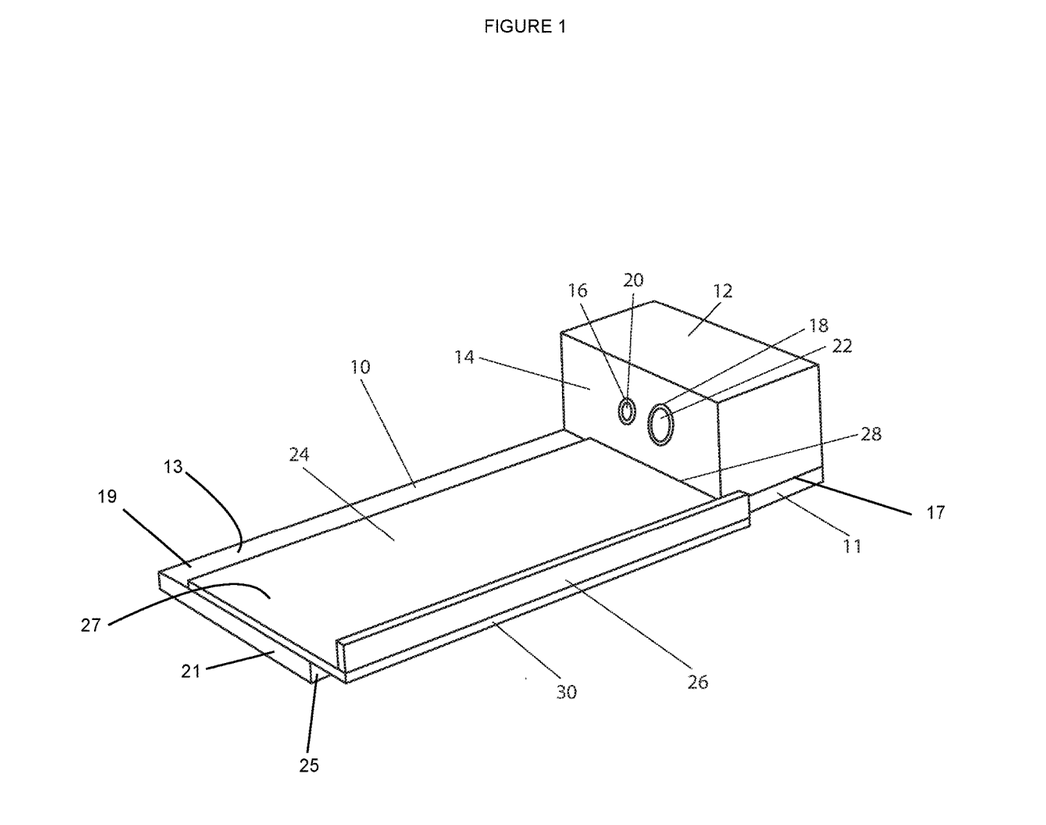
FIG. 1 shows an overall frontal perspective view of the embodiment of a three dimensional workpiece support/drill jig alignment device for placement of weight loading channels in the body of a model car.

FIG. 1 shows a perspective view of a three dimensional workpiece support/drill jig alignment embodiment.

FIGS. 1, 2, 5, 6 and 9 show referenced parts of the claimed invention, and include: rectangular base platform 10, having a long edge 11 (of rectangular base platform), a vertical sleeve bearing column 12, the base platform having a top surface 13, the sleeve bearing column having a Front face 14, the base platform having a bottom surface 15, the column having a small sleeve bearing pilot hole 16, the base platform having a first end 17, the column having a large sleeve bearing hole 18, the base platform having a second end 19, the pilot hole having a small sleeve bearing 20, the column having a top surface 21, the large sleeve having a large sleeve bearing 22, the base platform having a back edge 23, a sliding upper rectangular (sliding) platform 24, the column having a back face 25, the sliding platform having a lateral workpiece support guide 26, the sliding platform having a top surface 27, the sliding platform having a Front edge 28, a bottom surface 29, and a long side edge 30 of sliding upper rectangular platform.

As shown in the figures, these elements provide a claimed invention as follows: a three dimensional workpiece support/drill jig alignment device to facilitate precision placement of parallel, immediately adjacent, aligned channels in the body of a model car to load cylindrical weights, comprising:

(i) a rectangular base platform that is 140 mm in length, 55 mm in width, and 8 mm height, said base platform having a top surface 13 and a bottom surface 15, a first end 17 and a second end 19, and a front edge 21, a back edge 23, a first side edge 25, and an opposing second side edge 27;

(ii) a vertical sleeve-bearing rectangular column 12 that is 55 mm in length, 25 mm in width, and 25 mm in height, said column 12 having a top surface 21, a bottom surface, a front face 14 and a back face 23, and a first side face and a second side face, said column mounted on the first end 17 of said base platform 10 wherein the bottom surface of the column is seated on the top surface 13 of the base platform 10, and wherein the back face 23 of the column 12 is parallel to the back edge 23 of the base platform 10;

(iii) a small sleeve-bearing pilot hole 16 extends through the column 12 from the front face 14 to the back face 25, wherein the pilot hole 16 is cylindrical and has a diameter of 0.25 inches, wherein the axis of the pilot hole is perpendicular to the front face 14 and the back face 25 of the column 12, and wherein the pilot hole 16 has a metal lining sleeve 20 disposed within the pilot hole 16 that extends through the column 12 from the front face 14 to the back face 25 and has a inner diameter of 0.125 inches;

(iv) a large sleeve-bearing hole 18 extends through the column 12 from the front face 14 to the back face 25 and is adjacent the pilot hole 16, wherein the large hole 18 is cylindrical and has a diameter of 0.5 inches, wherein the axis of the large hole 18 is perpendicular to the front face 14 and the back face 25 of the column 12 and the axis of the large hole 18 and the pilot hole 16 are the same distance above the top surface 13 of the base platform 10, and wherein the large hole 18 has a metal lining sleeve 22 disposed within the large hole 18 that extends through the column 12 from the front face 14 to the back face 25 and has a inner diameter of 0.375 inches;

(v) an upper rectangular sliding platform 24 that is 115 mm in length, 55 mm in width, and 2 mm in height, said sliding platform 24 having a top surface 27 and a bottom surface 29, a first end and a second end, and a front edge 28, a back edge, a first side edge, and a second side edge 30, said sliding platform 24 slidably mounted on the base platform wherein the bottom surface 29 of the sliding platform 24 slides on the top surface 13 of the base platform, and wherein the front back edge 28 of the sliding platform 24 is parallel to the front face 14 of the column 12; and, (vi) a lateral workpiece support guide 26 that is 115 mm in length, 6 mm in width, and 2 mm in height, the lateral workpiece support guide having a top surface and a bottom surface, said lateral workpiece support guide 26 mounted on the top surface 27 of the sliding platform 24 wherein the bottom surface of the guide is attached to the top surface of the sliding platform, and the guide 26 is adjacent the first side edge 30 of the sliding platform 24.

Figure 2:
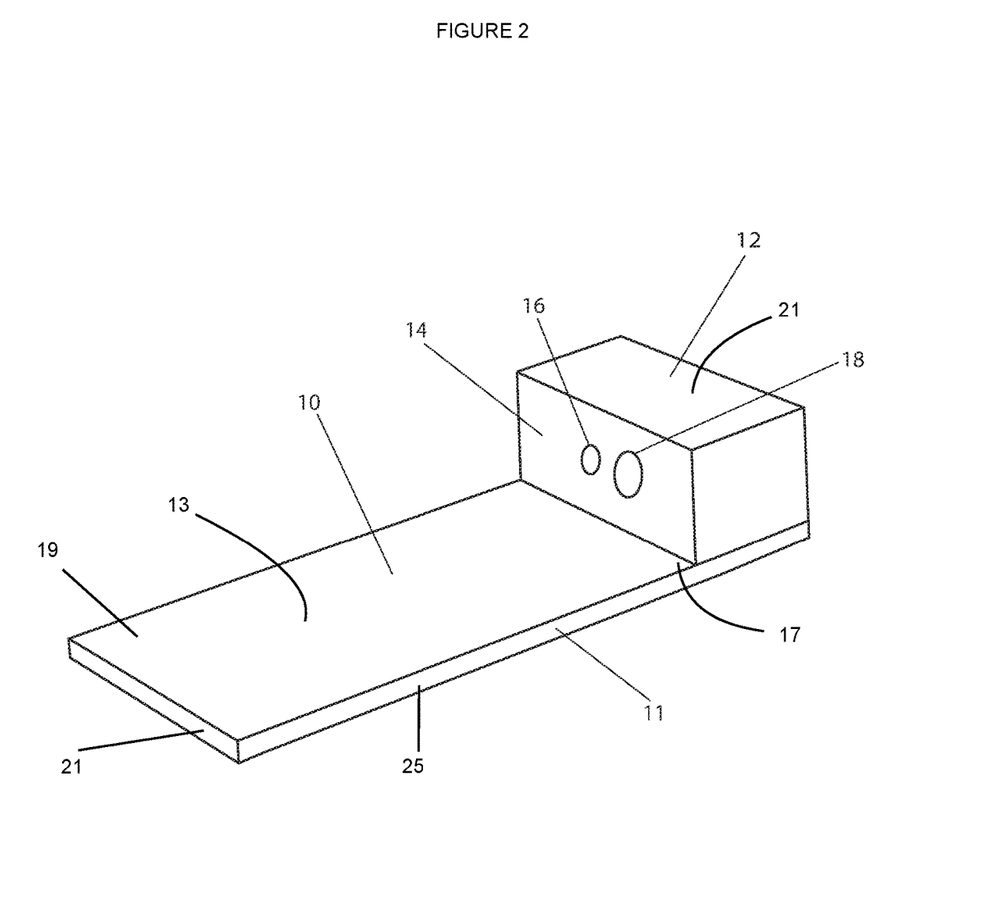
FIG. 2 is a perspective view of the basic L-shaped housing of the embodiment.

FIG. 2 shows the basic frame for the embodiment, an L-shaped housing consisting of a rectangular base platform 10, generally 140 mm in length, 55 mm in width and 8 mm in thickness. A vertical sleeve bearing column 12, generally 55 mm in length, 25 mm in thickness and 25 mm in height is mounted to the short side of the rectangular base platform 10 with the front face 14 of the vertical sleeve bearing column 12 perpendicular to the rectangular base platform 10 and at right angle to the long edge 11 of the rectangular base platform 10. The vertical sleeve bearing column 12 has a small sleeve bearing pilot hole 16 of predetermined size and predetermined position with the central axial plane of the small sleeve bearing pilot hole 16 running horizontal to the rectangular base platform 10 and perpendicular to the front face 14 of the vertical sleeve bearing column 12. The vertical sleeve bearing column 12 has a second large sleeve bearing hole 18 adjacent to the small sleeve bearing pilot hole 16 of predetermined size and in predetermined position with the central axial plane of the large sleeve bearing hole 18 running horizontal to the rectangular base platform 10 and perpendicular to the front face 14 of the vertical sleeve bearing column 12.

Figure 3A:
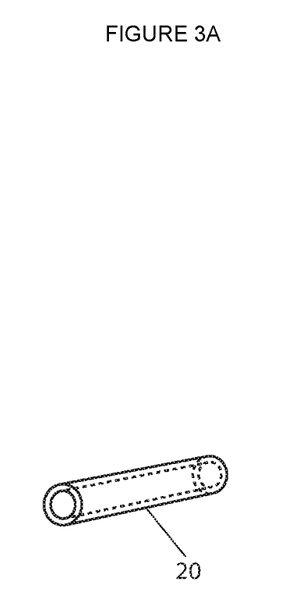
FIG. 3A depicts a sleeve bearing of specific predetermined dimension to accept and direct a pilot drill bit.

FIG. 3A demonstrates the small sleeve bearing (bushing) 20, generally ¼ inch in external diameter, ⅛ inch in internal diameter and 1 inch in length. The small sleeve bearing 20 is mounted within the small sleeve bearing pilot hole 16 of the vertical sleeve bearing column 12.

Figure 3B:
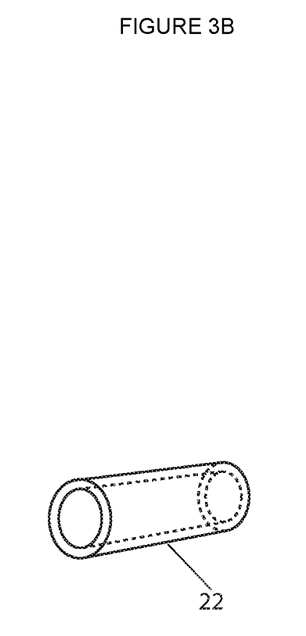
FIG. 3B depicts a sleeve bearing of specific predetermined dimension to accept and direct a drill bit of predetermined size to create a channel to accept cylindrical weights.

FIG. 3B depicts the large sleeve bearing 22, generally ½ inch in external diameter, ⅜ inch in internal diameter and I inch in length. The large sleeve bearing 22 is mounted within the large sleeve bearing hole 18 of the vertical sleeve bearing column 12.

Figure 4:
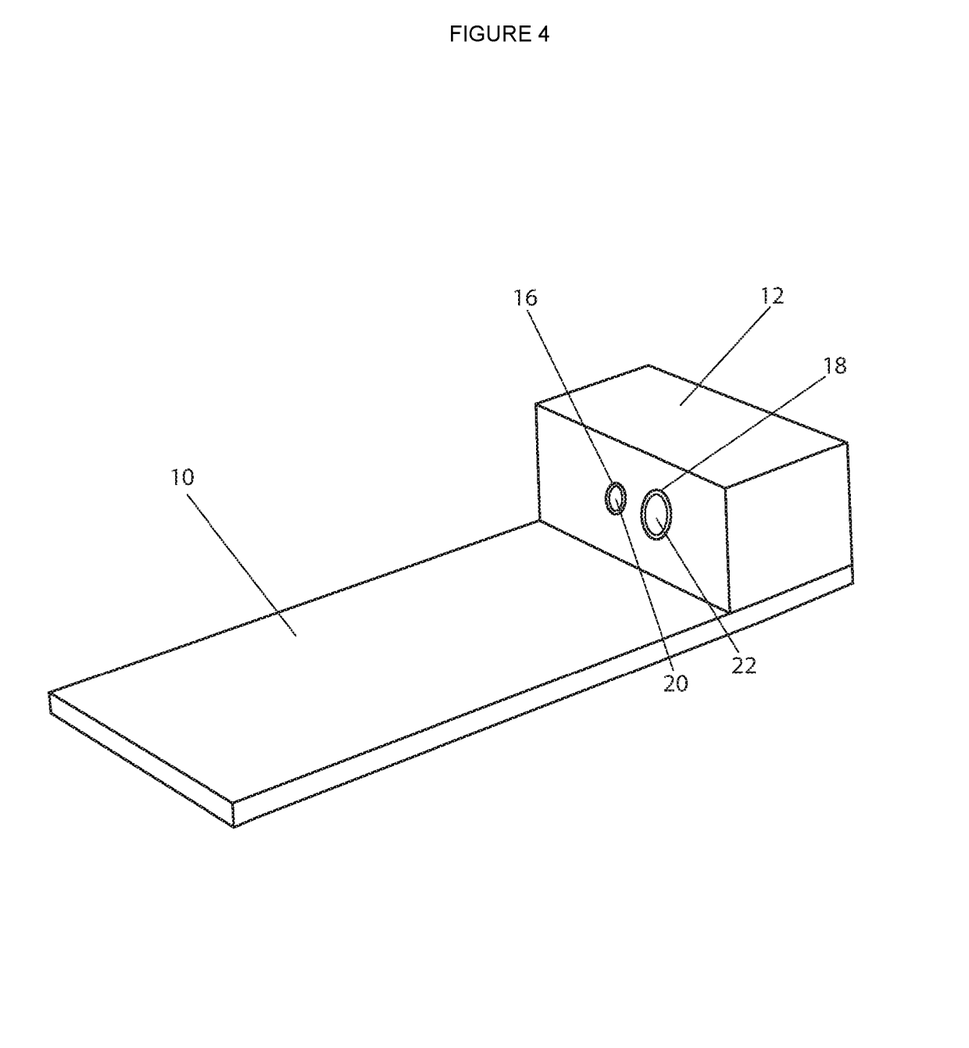
FIG. 4 shows the basic L-shaped housing of the embodiment with the sleeve bearings in position.

FIG. 4 depicts the basic L-shaped housing of the three dimensional workpiece support/drill jig alignment device showing a small sleeve bearing 20 lining the small sleeve bearing pilot hole 16 and a large sleeve bearing 22 lining the large sleeve bearing hole 18.

Figure 5:
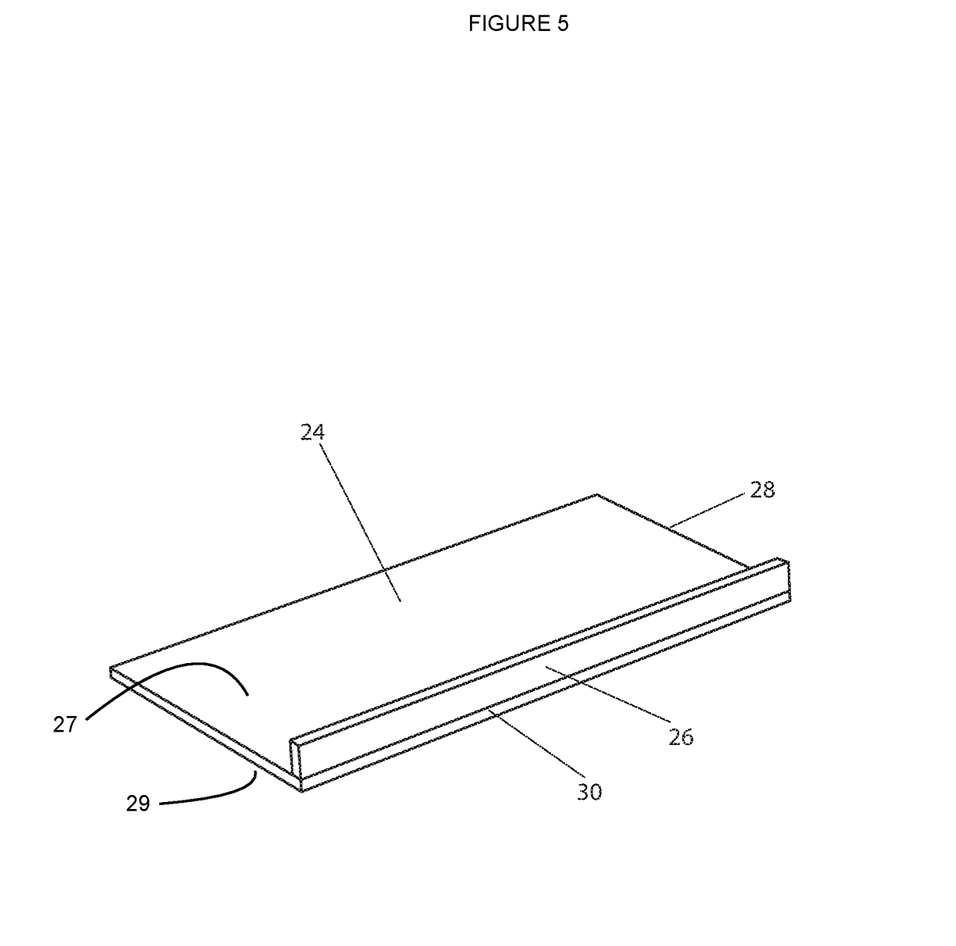
FIG. 5 shows the sliding upper rectangular platform with a lateral support column.

FIG. 5 shows a perspective view of a sliding upper rectangular platform 24, generally 115 mm in length, 55 mm in width and 2 mm in thickness. A lateral workpiece support column 26, generally 115 mm in length, 6 mm in width and 2 mm in thickness is mounted along the long edge 30 of the sliding upper rectangular platform 24, perpendicular to the sliding upper rectangular platform 24 and at 90 degrees to the front edge 28 of the sliding upper rectangular platform 24. The front edge 28 of the sliding upper rectangular platform 24 is positioned against the front face 14 of the vertical sleeve bearing column 12 with the lateral workpiece support column 26 at 90 degrees to the front face 14 of the vertical sleeve bearing column 12.

Figure 6:
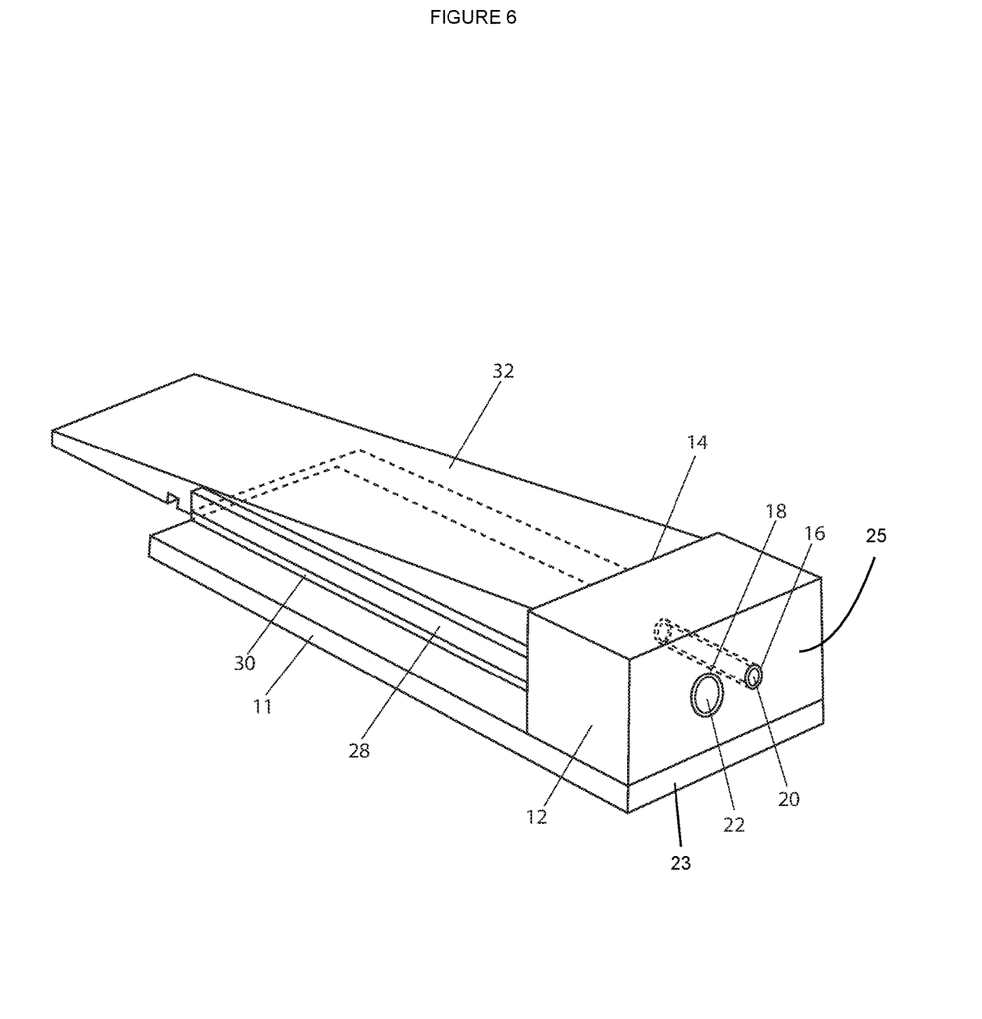
FIG. 6 shows a perspective view of the embodiment with a wedge-shaped model car workpiece in position for pilot hole placement in predetermined location.

FIG. 6 depicts a wedge-shaped model car workpiece 32 mounted on the embodiment to show the placement with the three dimensional surface support and positioning provided by the embodiment. The small sleeve bearing pilot hole 16 with the small sleeve bearing (bushing) 20 is in position for pilot hole access to a predetermined location on the back surface of the wedge-shaped model car workpiece 32. The front wheel axle groove 34 and the rear wheel axle groove 36 are depicted to show orientation of the wedge-shaped model car workpiece 32 on the embodiment.

Figure 7:
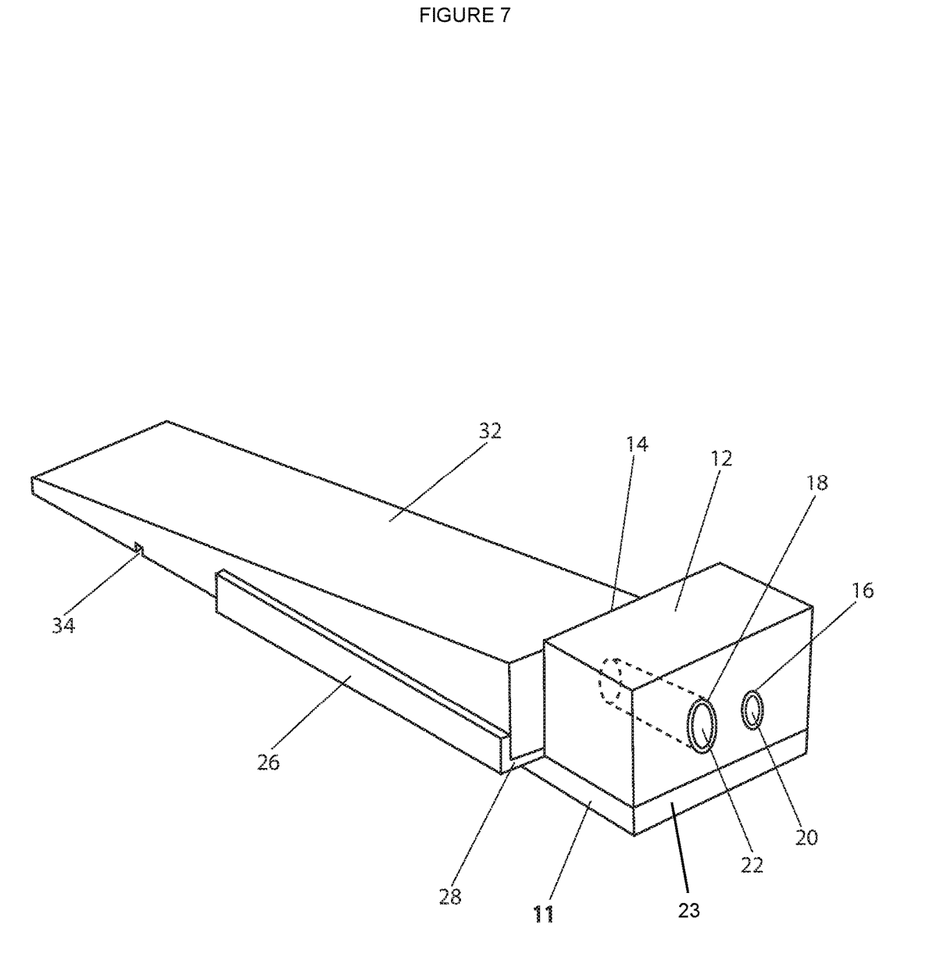
FIG. 7 shows a perspective view of the embodiment with the workpiece in position centering the pilot hole over the larger sleeve bearing hole for placement of a hole of predetermined size to accept cylindrical weights.

FIG. 7 depicts the wedge-shaped model car workpiece 32 in new location sliding the sliding upper rectangular platform 24 to position the central axis of the large sleeve bearing 22 in line with the center of the pilot hole previously created in the workpiece. The front edge 28 of the sliding upper rectangular platform 24 is mounted against the front face 14 of the vertical sleeve bearing column 12.

Figure 8:
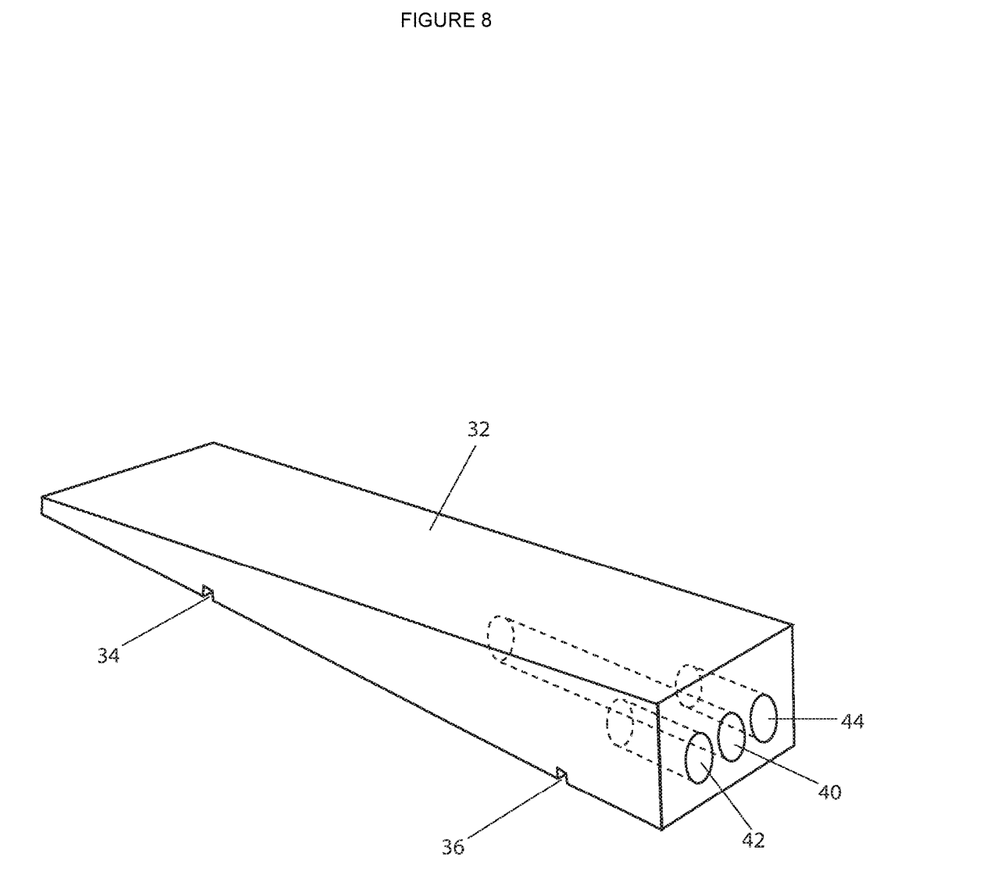
FIG. 8 is a perspective view of the back of a wedge shaped model car showing the precision placement of three, adjacent, parallel, aligned channels.

FIG. 8 in a perspective view, shows the back surface of the wedge-shaped model car workpiece 32, demonstrating the precision placement and alignment of immediately adjacent and parallel weight loading channels. A long central channel 38, a short left lateral channel 40 and a short right lateral channel 42 are depicted. The central axis of the small sleeve bearing pilot 16 hole and the large sleeve bearing hole 18 are in predetermined location to provide channels that do not encroach on or compromise the rear wheel axle groove 36 which traverses the bottom of the model car.

The embodiment, FIG. 1, as described operates very effectively to permit a child under the guidance of a parent or sponsor to produce weight loading channels within the wood body of the model car to minimize air resistance and optimize speed. The embodiment provides three dimensional support particularly to unique car shapes, precut and shaped to unique designs, where back surfaces may be rounded and side surfaces carved. Lateral support is thereby provided to the irregular workpiece utilizing the lateral workpiece support column 26 to maintain parallel alignment with the small sleeve bearing 20 and the large sleeve bearing 22. Using the embodiment, the Cub Scout can actively participate in the placement of parallel, immediately adjacent and aligned channels for loading weights within the body of the car, effectively avoiding a breaching of the axle grooves and the outer surfaces of the car.

An alternate embodiment, FIG. 8 utilizing the official rectangular wood blocks that are provided for Derby Car events is considered, potentially lowering manufacturing cost for commercial implementation. The official, model car wood blocks have specific dimensions and specifications providing for the linear alignment of axle grooves and 90 degree configuration to the top, bottom, side and end surfaces of the rectangular block of wood. Utilization of the square-cornered wood block, inserting the wood loading channels before the car is shaped in a particular design, facilitates the alternate embodiment. The alternate embodiment, FIG. 8, is represented by the basic L-shaped housing depicted in FIG. 2, comprised of the rectangular base platform 10 and a vertical sleeve bearing column 12 mounted to the short side of the rectangular base platform 10 with the front face 14 of the vertical sleeve bearing column 12 perpendicular to the rectangular base platform 10 and at a right angle to the long edge 11 of the rectangular base platform.

In this embodiment the model car workpiece is mounted directly on the rectangular base platform, positioning the back end 46 of the rectangular model car wood block 44 against the front face 14 of the vertical sleeve bearing column 12. In this position the lateral surface 48 of the rectangular model car wood block 44 is at 90 degrees to the front face 14 of the vertical sleeve bearing column 12. With the workpiece positioned and held in place with a ratcheting clamp 50, the need for a lateral workpiece support column 26 is obviated with the use of a square-cornered, linear surfaced workpiece. In this alternate embodiment which does not utilize the sliding upper rectangular platform, the central axis of the small sleeve bearing pilot hole 16 and the central axis of the large sleeve bearing hole 18 are lowered in predetermined location, horizontal to the rectangular base platform 10 and perpendicular to the front face 14 of the vertical sleeve bearing column 12.

Operation

Working with a parent or sponsor, the Cub Scout first carefully measures and marks with pencil lines the prospective placement of the weight channel holes at the back of the model car. This must be done with care, particularly if the car has been pre-shaped to the design of choice. Central points for the placement of one or more channels are placed by the child, keeping in mind spacing needed to accept commercially available weights ⅜ inches in diameter. The channel center points are then scored with a small nail both to sight the location through the small sleeve bearing 20 and to seat the pilot drill bit.

The Cub Scout then places the model car workpiece on the three dimensional workpiece support/drill jig alignment device, FIG. 1, mounting the back surface of the wedge-shaped model car workpiece 32 against the front face 14 of the vertical sleeve bearing column 12 with the left side of the car seated against the lateral workpiece support column 26. The sliding upper rectangular platform 24 is positioned with the front edge 28 against the front face 14 of the vertical sleeve bearing column 12 such that the lateral workpiece support column 26 is supporting the left side of the wedge-shaped model car workpiece 32, FIG. 6, at 90 degrees to the front face 14 of the vertical sleeve bearing column 12. The workpiece is now supported at the bottom, side and back edge in predetermined position to drill the pilot hole. The workpiece is held in place by the parent, as the child with a hand-held drill advances the drill bit into the small sleeve bearing (bushing) 20 of the lateral sleeve bearing column 12 to a predetermined depth, creating a pilot hole.

At this point the Cub Scout then repositions the back surface of the wedge-shaped model car work-piece 32 by sliding the upper rectangular platform 24, to center the central axis of the large sleeve bearing 22 over the pilot hole which has been previously placed, FIG. 7. The child, utilizing the hand drill, advances a drill bit of predetermined size into the large sleeve bearing 22 to a predetermined depth in an axis horizontal to the bottom of the car and parallel to the side of the car.

In similar fashion, multiple, immediately adjoining, parallel holes can easily be placed for weight loading the derby car. Channels are placed safely by the Cub Scout, with near drill press precision using a small hand-held device. Similarly, additional smaller workpiece components 2 cm in size, such as wood dowels, can be held and positioned to drill out and simulate carburetors or exhaust pipes for unique model car designs.

Operation of Alternate Embodiment

Figure 9:
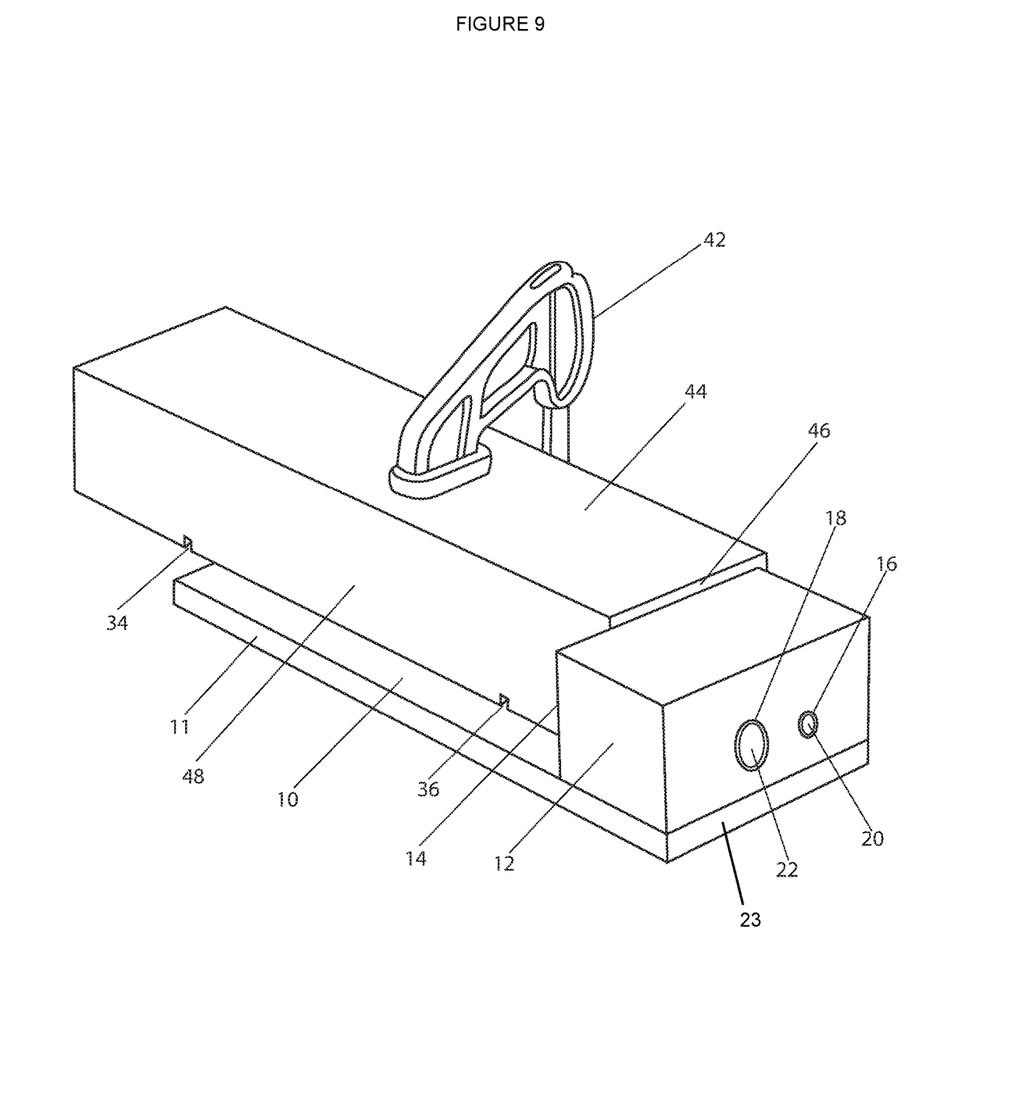
FIG. 9 shows an alternate configuration of the first embodiment, comprised of the basic L-shaped embodiment, depicting the placement of a rectangular model car wood block.

FIG. 9 depicts an embodiment which utilizes the basic L-shaped housing FIG. 2 of the first embodiment, FIG. 1. In this embodiment the Cub Scout is utilizing the official, rectangular model car wood block 44 provided in the Cub Scout kit which have specific dimensions and specifications providing for a 90 degree adjoining surface configuration to the top, bottom, side and end surfaces of the rectangular block. All corners are at 90 degrees.

As described in the first embodiment, in similar fashion, markings are carefully placed in predetermined location at the back end 46 of the car to serve as access points to accept one or more weight loading channels. Again, these points are scored by the Cub Scout with a small nail to sight, position and seat the pilot drill bit through the small sleeve bearing 20.

Using this trued, original rectangular block of wood, before it is cut into a particular car design, the child places the rectangular model car wood block 44 on the surface of the rectangular base platform 10. The back end 46 of the rectangular block is positioned squarely against the front face 14 of the vertical sleeve bearing column 12. The predetermined site marked on the back end 46 of the rectangular model car wood 44 block is positioned in the center of the small sleeve bearing. The Cub Scout then applies a small ratchet clamp 50 to hold this position, maintaining the lateral surface 48 of the rectangular model car wood block 44 at 90 degrees to the front face 14 of the vertical sleeve bearing column 12. For the child, this permits pilot drill bit access with channel placement parallel to the side and horizontal to the bottom of the car in predetermined location. In similar fashion, the Cub Scout repositions the back end 46 of the rectangular model car wood block 44 to center the large sleeve bearing 22 over the pilot hole which has been placed in the rectangular model car wood block 44, securing it with the small ratchet clamp 50. Again, with the parent holding the embodiment with the workpiece affixed, the Cub Scout, utilizing a hand-held electric drill, now advances the drill bit of predetermined size toward the task or creating a channel for the placement of the cylindrical weight. The Cub Scout repeats this process to create multiple, adjacent, aligned channels. The child, with parental assistance, is participating in the placement of multiple weight loading channels within the wood body of a model car with near drill press precision using a small hand-held embodiment.

CONCLUSIONS, RAMIFICATIONS, AND SCOPE

The first embodiment provides a device needed to secure an irregular model car workpiece to provide aligned drill bit access to configure multiple, parallel, immediately adjacent and aligned channels for the loading of cylindrical weights within the wood body of the model car. This is an essential feature: centering the weights beneath the wood surface to reduce air flow turbulence and optimize speed.

The application of more sophisticated drill jig and machine shop equipment including the drill press to this task, limits Cub Scout participation. Moreover, the device provides a small, hand held embodiment which enhances the opportunity for the child to understand the concepts of symmetry, parallel alignment and the need for precise measurement.

The device has been reduced to practice. A prototype performs easily, safely and with exceptional accuracy.

The optimal dimensional relationships of the workpiece support planes to drill jig alignment and the sleeve bearings may vary with respect to size and configuration.

I contemplate that the components of the basic L-shaped housing platforms and columns be made of an acrylic, but other materials are also available including aluminum, ferrous and nonferrous metals and their alloys. In less durable materials the sleeve bearings holes are lined with metallic bushings to provide a more durable support to repetitive steel drill bit contact.

The scope, intent, and spirit of the embodiment is to provide a structure with a defined configuration which can be utilized by a child or persons of almost any age toward the task of producing parallel, aligned channels in a small workpiece utilizing drill bits and an electric hand-drill. The concept of the embodiment is to encompass small, hand-held workpieces toward the above task with accuracy in a timely manner.

I claim:

1. A three dimensional workpiece support/drill jig alignment device to facilitate precision placement of parallel, immediately adjacent, aligned channels in a body of a model car to load cylindrical weights, comprising:
    a rectangular base platform that is 140 mm in length, 55 mm in width, and 8 mm in thickness, said base platform having a top surface, a first end and a second end, and a front edge, a back edge, a first side edge;
    a vertical sleeve-bearing rectangular column that is 55 mm in length, 25 mm in thickness, and 25 mm in height, said column having a top surface, a front face and a back face, said column mounted on the first end of said base platform wherein the column is seated on the top surface of the base platform, and wherein the back face of the column is parallel to the back edge of the base platform;
    a small sleeve-bearing pilot hole extends through the column from the front face to the back face, wherein the pilot hole is cylindrical and has an external diameter, wherein an axis of the pilot hole is perpendicular to the front face and the back face of the column, and wherein the pilot hole has a metallic bushing disposed within the pilot hole that extends through the column from the front face to the back face and has a inner diameter of 0.125 inches;
    a large sleeve-bearing hole extends through the column from the front face to the back face and is adjacent the pilot hole, wherein the large hole is cylindrical and has an external diameter, wherein an axis of the large hole is perpendicular to the front face and the back face of the column and the axis of the large hole and the pilot hole are at a same distance above the top surface of the base platform, and wherein the large hole has a metal lining sleeve disposed within the large hole that extends through the column from the front face to the back face and has a inner diameter of 0.375 inches;
    an upper rectangular sliding platform that is 115 mm in length, 55 mm in width, and 2 mm in height, said sliding platform having a top surface and a bottom surface, a front edge, and a side edge, said sliding platform slidably mounted on the base platform wherein the bottom surface of the sliding platform slides on the top surface of the base platform, and wherein the front edge of the sliding platform is parallel to the front face of the column; and,
    a lateral workpiece support guide that is 115 mm in length, 6 mm in width, and 2 mm in thickness, said lateral workpiece support guide mounted on the top surface of the sliding platform, and the guide is adjacent the side edge of the sliding platform.

2. The device of claim 1, wherein the platform, the column, the sliding platform, and the guide are made from acrylic.

* * * * *